US007537743B2

(12) United States Patent
Higgins

(10) Patent No.: US 7,537,743 B2
(45) Date of Patent: May 26, 2009

(54) METHOD FOR IN-FURNACE REGULATION OF $SO_3$ IN CATALYTIC NOX REDUCING SYSTEMS

(75) Inventor: Brian S. Higgins, Raleigh, NC (US)

(73) Assignee: Mobotec USA, Inc., Orinda, CA (US)

( * ) Notice: Subject to any disclaimer, the term of this patent is extended or adjusted under 35 U.S.C. 154(b) by 893 days.

(21) Appl. No.: 10/798,088

(22) Filed: Mar. 11, 2004

(65) Prior Publication Data
US 2005/0180904 A1    Aug. 18, 2005

Related U.S. Application Data

(60) Provisional application No. 60/544,724, filed on Feb. 14, 2004.

(51) Int. Cl.
*B01D 53/52*    (2006.01)
(52) U.S. Cl. .................................... 423/235; 423/242.1
(58) Field of Classification Search ................. 423/235, 423/239.1, 242.1, 244.01
See application file for complete search history.

(56) References Cited

U.S. PATENT DOCUMENTS

| | | | |
|---|---|---|---|
| 3,105,540 A | 10/1963 | Hardgrove | 431/9 |
| 3,528,797 A | 9/1970 | Funk et al. | 71/39 |
| 3,565,575 A | 2/1971 | Warshaww et al. | 23/2 |
| 3,773,897 A | 11/1973 | Fields et al. | 423/235 |
| 3,847,564 A | 11/1974 | Marion et al. | 48/95 |
| 3,860,384 A | 1/1975 | Vulliet et al. | 431/4 |
| 3,900,554 A | 8/1975 | Lyon | 423/235 |
| 3,970,739 A | 7/1976 | Shiraishi et al. | 423/23 S |
| 4,021,188 A | 5/1977 | Yamagishi et al. | 431/158 |
| 4,029,752 A | 6/1977 | Cahn | 423/563 |
| 4,039,446 A | 8/1977 | Ban et al. | 210/688 |
| 4,080,423 A | 3/1978 | Smith et al. | 423/210 |
| 4,089,639 A | 5/1978 | Reed et al. | 431/211 |
| 4,119,702 A | 10/1978 | Azuhata et al. | 423/235 |
| 4,150,631 A | 4/1979 | Frey et al. | 110/186 |
| 4,154,581 A | 5/1979 | Nack et al. | 48/197 R |
| 4,173,454 A | 11/1979 | Heins | 44/522 |
| 4,196,057 A | 4/1980 | May et al. | 205/775.5 |
| 4,208,386 A | 6/1980 | Arand et al. | 423/235 |
| 4,213,944 A | 7/1980 | Azuhata et al. | 423/235 |
| 4,294,178 A | 10/1981 | Borio et al. | 110/347 |
| 4,325,924 A | 4/1982 | Arand et al. | 423/235 |
| 4,375,949 A | 3/1983 | Salooja | 431/7 |
| 4,381,718 A | 5/1983 | Carver et al. | 110/347 |
| 4,469,050 A | 9/1984 | Korenberg | 122/4 D |
| 4,502,633 A | 3/1985 | Saxon | 239/422 |
| 4,504,211 A | 3/1985 | Beardmore | 44/604 |
| 4,506,608 A | 3/1985 | Strohmeyer, Jr. | 110/245 |
| 4,507,075 A | 3/1985 | Buss et al. | 421/115 |
| 4,507,269 A | 3/1985 | Dean et al. | 423/235 |
| 4,565,137 A | 1/1986 | Wright | 110/264 |
| 4,584,948 A | 4/1986 | Syred et al. | 110/264 |
| 4,624,840 A | 11/1986 | Dean et al. | 423/235 |
| 4,627,965 A | 12/1986 | Hegemann et al. | 423/242 |
| 4,672,900 A | 6/1987 | Santalla et al. | 431/9 |
| 4,704,084 A | 11/1987 | Liu et al. | 431/7 |
| 4,751,065 A | 6/1988 | Bowers | 423/235 |
| 4,777,024 A | 10/1988 | Epperly et al. | 423/235 |
| 4,780,289 A | 10/1988 | Epperly et al. | 223/235 |
| 4,824,441 A | 4/1989 | Kindig | 44/604 |
| 4,842,834 A | 6/1989 | Burton | 423/235 |
| 4,873,930 A | 10/1989 | Egense et al. | 110/345 |
| 4,915,036 A | 4/1990 | DeVita | 110/215 |
| 4,927,612 A | 5/1990 | Bowers | 423/235 |
| 4,962,711 A | 10/1990 | Yamauchi et al. | 110/347 |
| 4,978,514 A | 12/1990 | Hofmann et al. | 423/235 |
| 4,985,218 A | 1/1991 | DeVita | 423/235 |
| 4,992,249 A | 2/1991 | Bowers | 423/235 |
| 5,017,347 A | 5/1991 | Epperly et al. | 423/235 |
| 5,032,154 A | 7/1991 | Wright | 422/109 |
| 5,048,432 A | 9/1991 | Hofmann et al. | 110/345 |
| 5,052,921 A | 10/1991 | Hemsath | 423/121 |
| 5,057,293 A | 10/1991 | Epperly et al. | 423/235 |
| 5,105,747 A | 4/1992 | Khinkis et al. | 110/345 |
| 5,139,754 A | 8/1992 | Luftglass et al. | 423/235 |
| 5,146,858 A | 9/1992 | Tokuda et al. | 110/261 |
| 5,240,404 A | 8/1993 | Hemsath et al. | 431/9 |
| 5,261,602 A | 11/1993 | Brent et al. | 239/132.3 |
| 5,286,467 A | 2/1994 | Sun et al. | 423/239.1 |
| 5,310,334 A | 5/1994 | Spiros | 431/5 |
| 5,336,081 A | 8/1994 | Saito et al. | 431/190 |
| 5,342,592 A | 8/1994 | Peter-Hoblyn et al. | 423/235 |
| 5,345,883 A | 9/1994 | Panos | 110/345 |
| 5,489,419 A | 2/1996 | Diep et al. | 423/235 |
| 5,536,482 A | 7/1996 | Diep et al. | 423/235 |

(Continued)

FOREIGN PATENT DOCUMENTS

DE    28 37 156 A1    3/1979

(Continued)

OTHER PUBLICATIONS

Energy efficiency-our specialty; Mobotec, undated related technology.
Combined DeNOx/DeSOx and Additional NOx Reduction by Cleaning Flue Gas Condensate From Ammonia; Moberg et al.; presented at PowerGen Int'l., Nov. 30-Dec. 2, 1999.

(Continued)

*Primary Examiner*—Edward M Johnson
(74) *Attorney, Agent, or Firm*—MacCord Mason PLLC

(57) ABSTRACT

A method of controlling $SO_3$ flue gas concentration in a combustion process utilizing a SCR using a sulfurous fuel, the method steps including: providing a combustion system with low NOx burners and SCR; partially combusting the fuel in a first stage to create a reducing environment; maintaining the reducing environment for a sufficient time period such that $SO_3$ is reduced to $SO_2$ to achieve a desirable level of $SO_3$; combusting the remainder of the fuel and combustion intermediates in a second stage with oxidizing environment; reducing the remaining NOx with the SCR; thereby reducing emissions NOx.

17 Claims, No Drawings

U.S. PATENT DOCUMENTS

| | | | | |
|---|---|---|---|---|
| 5,585,081 A * | 12/1996 | Chu et al. | | 423/239.1 |
| 5,690,039 A | 11/1997 | Monroe et al. | | 110/264 |
| 5,707,596 A | 1/1998 | Lewandowski et al. | | 423/235 |
| 5,728,357 A | 3/1998 | von Harpe | | 423/239.1 |
| 5,809,910 A | 9/1998 | Svendssen | | 110/235 |
| 5,853,684 A | 12/1998 | Fang et al. | | 423/244.1 |
| 5,854,173 A | 12/1998 | Chang et al. | | 502/417 |
| 6,019,068 A | 2/2000 | Tsuo et al. | | 122/4 D |
| 6,042,371 A | 3/2000 | Mitani et al. | | 431/215 |
| 6,109,911 A | 8/2000 | Tamminen et al. | | 431/4 |
| 6,190,628 B1 | 2/2001 | Carter | | 422/168 |
| 6,213,032 B1 | 4/2001 | Breen et al. | | 110/345 |
| 6,230,664 B1 | 5/2001 | Janka et al. | | 112/4 D |
| 6,280,695 B1 | 8/2001 | Lissiamski et al. | | 423/239.1 |
| 6,315,551 B1 | 11/2001 | Salzieder et al. | | 431/183 |
| 6,357,367 B1 | 3/2002 | Breen et al. | | 110/345 |
| 6,398,039 B1 | 6/2002 | Xue et al. | | 210/504 |
| 6,485,289 B1 | 11/2002 | Kelly et al. | | 431/4 |
| 6,527,828 B2 | 3/2003 | Flippo et al. | | 95/54 |
| 6,532,905 B2 | 3/2003 | Belin et al. | | 122/4 D |
| 6,818,043 B1 | 11/2004 | Chang et al. | | 95/37 |
| 6,953,494 B2 | 10/2005 | Nelson, Jr. | | 95/134 |
| 7,198,769 B2 * | 4/2007 | Cichanowicz | | 423/239.1 |
| 7,335,014 B2 | 2/2008 | Higgins | | 431/4 |
| 2003/0110948 A1 | 6/2003 | Gaita et al. | | 96/108 |
| 2004/0045437 A1 | 3/2004 | Chang et al. | | 95/134 |
| 2004/0120872 A1 | 6/2004 | Fan et al. | | 423/239.1 |
| 2004/0185399 A1 | 9/2004 | Moberg | | 431/4 |
| 2004/0185401 A1 | 9/2004 | Moberg | | 431/9 |
| 2004/0185402 A1 | 9/2004 | Moberg | | 431/9 |
| 2004/0253161 A1 | 12/2004 | Higgins | | 423/235 |
| 2005/0000901 A1 | 1/2005 | Campbell et al. | | 210/660 |
| 2005/0002841 A1 | 1/2005 | Moberg | | 423/235 |
| 2005/0013755 A1 | 1/2005 | Higgins | | 423/235 |

FOREIGN PATENT DOCUMENTS

| | | |
|---|---|---|
| EP | 0287224 A2 | 10/1988 |
| EP | 0326943 A2 | 1/1989 |
| EP | 0936405 | 8/1999 |
| GB | 2 001 419 A | 5/1978 |
| JP | 53-112273 | 9/1978 |
| JP | 2003021322 | 1/2003 |
| WO | WO 87/03507 A1 | 6/1987 |
| WO | WO2005/079305 A3 | 2/2005 |

OTHER PUBLICATIONS

RJM-LT, "Does This New NOx Control Technology Obsolate SCRs?" RJM Corporation; undated related technology.

* cited by examiner

METHOD FOR IN-FURNACE REGULATION OF $SO_3$ IN CATALYTIC NOX REDUCING SYSTEMS

CROSS-REFERENCE TO RELATED APPLICATIONS

This nonprovisional utility patent application claims the benefit of a prior filed provisional application: 60/544,724 filed Feb. 14, 2004, which is incorporated herein by reference in its entirety.

BACKGROUND OF THE INVENTION

1. Field of the Invention

The present invention relates generally to a method for reducing byproducts emissions from combustion reactions, and, more particularly, to a method for regulating flue gas $SO_3$ in combustion furnaces with catalysts.

2. Description of the Prior Art

Acidity decrease

The flue gas of power generation plants has long been recognized as a source of atmospheric pollution. In the combustion of fossil fuels, some of the naturally present elements are oxidized to form acids, such as $SO_3$, NOx, HCl, HF, and the like. These acids, especially $SO_3$, can become a problem if their concentrations exceed certain thresholds. For example, as the $SO_3$ concentration increases, the acid dewpoint temperature of the flue gas increases. If the temperature of the flue gas is less than the acid dewpoint temperature of the flue gas, the $SO_3$ in the gas will condense and react with water to form $H_2SO_4$, causing corrosion problems inside the furnace. Also, flue gases exiting a furnace cool immediately and $SO_3$ and other acids in the gas condense, creating localized acid rain, which is the condensation and precipitation of $SO_3$ and other acids onto the surrounding land with subsequent corrosion. Excessive $SO_3$ will condense into small droplets, creating a visible plume as it exits the furnace, which becomes an esthetic and local political problem. If $NH_3$-like compounds are present in the flue gas, they can react with $SO_3$ to form ammonium bisulfate ($NH_3HSO_4$) which then fouls the air heater.

Thus, a need exists to decrease the acid dewpoint temperature of the flue gases such that the acid dewpoint temperature is lower than the flue-gas temperature in the coolest parts of the furnace, such as the ducts and stack. A further need exists to lower the acid content of the flue gases such that the localized acid rain and other problems associated with high-acid flue gas are minimized.

$SO_3$ Increase

The particulate matter carried in the flue gas can be removed by electrostatic precipitators that cause the individual particles to accept an electrical charge and then use that charge to attract them to collector plates for disposal. The efficiency of such electrostatic precipitators is dependent upon the ability of the individual particles to take a charge, that is, the resistivity of the particles. It has been found that the presence of $SO_3$ in the flue gas effectively reduces the resistivity of the particles, making them easier to charge electrostatically.

In the combustion of coal, some of the naturally present sulfur is converted to $SO_3$. On the other hand, the effectiveness of $SO_3$ in reducing the resistivity of the particulate matter in the flue gas depends upon the concentration of the $SO_3$, with about 15 to 20 parts per million (ppm) giving optimal results. Therefore, precipitator efficiency is affected by the ability to adjust the amount of $SO_3$ in the flue gas, regardless of the sulfur content of the coal being burned, to provide an overall $SO_3$ concentration in the optimal range.

$SO_3$ is also produced in SCR (catalyst) installations by the oxidation of $SO_2$ and often exceeds the optimal 15 to 20 ppm optimal concentrations. The catalyst blends typically used in the SCR to reduce NOx to $N_2$ (in the presence of ammonia) also oxidize $SO_2$ to $SO_3$. The rate of this reaction is strongly temperature dependent and, at higher temperatures, can convert more than 1 percent of $SO_2$ to $SO_3$. High sulfur U.S. coal generates anywhere from 2,000 to 3,000 ppm of $SO_2$ in the boiler, and therefore can result in 20 to 30 ppm of $SO_3$ out of the SCR. The problem is that as much as 50 percent, or 10 to 15 ppm, of the $SO_3$ coming out of the SCR will make it past the scrubber and out of the stack. At about 8 to 10 ppm, depending upon the particulate concentration, $SO_3$ becomes visible as a blue plume.

Furthermore, $SO_3$ can also be produced catalytically on other boiler surfaces through interaction with elements/chemicals such as Vanadium.

Therefore, because any $SO_3$ formed prior to the SCR adds to the effluent $SO_3$, reducing the $SO_3$ formed prior to the SCR is important for reducing the effluent $SO_3$ and permits the use of SCR for the reduction of NOx for gases without generating excessive amounts of $SO_3$.

$SO_3$ Control

If the $SO_3$ concentration is too low, the precipitator will operate at less than optimal efficiency. On the other hand, if the $SO_3$ concentration is too high, the flue gas becomes highly acidic, creating a "blue plume" and contributing to acid rain. In addition, acidic flue gases contribute to corrosion of the pipes carrying the flue gas, and, when combined with $NH_3$-type chemicals, can clog the air heater.

Furthermore, an SCR is often only intended to be used for six months per year (during the summer ozone control season), and are bypassed during the winter. This creates seasonal variability in the $SO_3$ concentrations at the precipitator, in the duct work, and out of the exhaust stack.

It is therefore desirable to control the concentrations of $SO_3$ in the flue gas depending upon whether the SCR is in use or not. $SO_3$ concentrations approaching 40 ppm produce severe adverse local acid problems that are not necessarily regulated, but create local political problems for the facility. The U.S. EPA has indicated that future regulations on $SO_3$ emissions are to be expected.

It is desirable, therefore, to have an $SO_3$ flue gas system that is capable of adjusting the concentrations of $SO_3$ in a flue gas with or without an SCR installed to maintain the $SO_3$ concentration at an optimal level for increased ESP performance, without increased localized $SO_3$ emissions.

Staging

Combustion staging is the process of burning a fuel, i.e., coal, in two or more stages. A fuel-rich stage, or simply, rich stage, is one in which not enough air is available to fully burn the fuel. A fuel-lean stage is one in which there is sufficient or extra air to fully burn the fuel. Staging is used in the prior art to reduce NOx by a) reducing peak temperatures (thermal NOx) and b) providing a reducing environment (NOx reduction). Macro-staging is the dividing of whole sections of a furnace into rich and lean stages and is accomplished through the use of such techniques as Over-Fired Air (OFA). Micro-staging is the creation of proximal microenvironments with functionally different characteristics, such as reduction potential, temperature, and the like. Micro-staging in a furnace can be achieved, for example, in the first stage of the furnace through the use of Low-NOx burners with adjustment of spin-vane settings and registers. Increased staging increases the residence time in a reducing atmosphere and increases the effect of the reducing atmosphere.

Prior art has used micro-staging to reduce NOx emissions in combustion furnaces. Low-NOx burners (LNB) stage by delivering high-fuel-content primary air into the furnace that mixes with secondary air flowing through one or more secondary air registers. LNB primarily use micro-staging. The flow through a LNB is designed such that the volatile components of the coal mix with the available near-field air at a stoichiometric ratio near unity (1.0), thus anchoring the flame. The net combustion in the central core near the burners is overall fuel rich and does not produce much thermal NOx, as the temperatures are low. The coal is eventually consumed over the depth of the furnace as more and more air slowly mixes into the central core. The majority of the NOx created in this region is from the fuel-bound nitrogen reacting to NO through the intermediate HCN. The rate at which the outer secondary air mixes into the core flow is set by the dampers and the spin vanes, as well as the spin vane in the coal pipe. LNB systems decrease NOx by staging since there is a continuous mixing of the rich products of combustion and secondary air throughout the combustion zone. Staging is increased by decreasing the mixing rate between the rich core flow and the outer secondary air flow.

Prior art has used macro-staging to reduce emissions in combustion furnaces. Macro-staging consists of highly mixed fuel and air in the lower furnace, mixed to a stoichiometric ratio below unity for a large part of the flow. Excess oxygen is ultimately required to assure that all of the fuel has burned and to reduce explosion risks. In a macro-staged furnace, excess air is introduced downstream of the burners. Increased staging is achieved by increasing the residence time, temperature, or reducing quality of the combustion products in the absence of oxygen.

Prior art used both micro-staging (LNB) and macro-staging (OFA) to reduce NOx emissions in combustion furnaces. In the case of both micro-staging and macro-staging, components of each of the above are used and adjusted to achieve NOx emissions reduction.

Staging has nowhere been taught in the prior art for flue gas acidity reduction, acid dewpoint temperature control or $SO_3$ concentration control in combustion gases.

SUMMARY OF THE INVENTION

The present invention is directed to method of controlling $SO_3$ flue gas concentration in a combustion process utilizing a SCR using a sulfurous fuel.

It is therefore an aspect of the present invention to provide a method of controlling $SO_3$ flue gas concentration in a combustion process utilizing a SCR using a sulfurous fuel, including the steps of:
a) providing a combustion system with low NOx burners and SCR
b) partially combusting the fuel in a first stage to create a reducing environment;
c) maintaining the reducing environment for a sufficient time period such that $SO_3$ is reduced to $SO_2$ to achieve a desirable level of $SO_3$;
d) combusting the remainder of the fuel and combustion intermediates in a second stage with oxidizing environment;
e) reducing the remaining NOx with the SCR;

thereby reducing emissions NOx.

Another aspect of the present invention provides a method of controlling $SO_3$ flue gas concentration in a combustion process utilizing a SCR using a sulfurous fuel, including the steps of:
a) providing a combustion furnace with low NOx burners and SCR
b) partially combusting the fuel in a first stage to create a reducing environment;
c) combusting the remainder of the fuel and combustion intermediates in a second stage with oxidizing environment;
d) measuring the acid dewpoint of the flue gas;
e) adjusting the reducing environment in the first stage such that the flue gas acid dewpoint is lowered to a desirable level;

thereby controlling the $SO_3$ concentration of the flue gas.

Still another aspect of the present invention provides a combustion furnace operated with a method for reducing the acidity of the flue gas, the method steps including:
a) providing a combustion system with low NOx burners and SCR
b) partially combusting the fuel in a first stage to create a reducing environment;
c) maintaining the reducing environment for a sufficient time period such that $SO_3$ is reduced to $SO_2$ to achieve a desirable level of $SO_3$;
d) combusting the remainder of the fuel and combustion intermediates in a second stage with oxidizing environment;
e) reducing the remaining NOx with the SCR;

thereby reducing emissions NOx.

These and other aspects of the present invention will become apparent to those skilled in the art after a reading of the following description of preferred embodiment(s) when considered with the drawings.

DETAILED DESCRIPTION OF THE INVENTION

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. In the present invention, "reducible acid" refers to acids in which the acidity can be reduced or eliminated by the electrochemical reduction of the acid.

The present invention is directed to a method for in-furnace decrease and control of the acid dewpoint temperature using combustion staging. The present invention is further directed to a method for in-furnace reduction and control of $SO_3$ using combustion staging. Increased staging is advantageously used to simultaneously decrease the acidity, decrease the acid dewpoint temperature and reduce the $SO_3$ levels of the flue gas.

Acidity, Acid Dewpoint Temperature and $SO_3$ Reduction Through Micro-staging

Similar to how NOx is reduced back to $N_2$ in a rich "reducing" environment, $SO_3$ is reduced back to $SO_2$ in a reducing environment. With macro-staging, the center of the furnace below the OFA ports is largely fuel-rich. This staged environment can be adjusted to be even less mixed to create reducing micro-stages within the first stage of the furnace. The mixing can be reduced by reducing the spin vane velocity settings of the primary air and coal flow, or additionally or otherwise, the secondary air spin vane and register settings, thus creating reducing micro-stages, or additionally or otherwise, the relative exit velocities between the primary air and coal flow and the secondary air flow can be changed.

While the majority of fuel-bound sulfur forms $SO_2$, some forms $SO_3$ directly during combustion of the fuel-bound sulfur. $SO_2$ can react to form more $SO_3$ through the following oxidative reaction:

$$SO_2 + O(+M) \rightarrow SO_3(+M)$$

However, this three-body reaction is very slow. An additional source for $SO_3$ production in an oxidative environment is through the reaction:

$$SO_2 + O_2 \rightarrow SO_3 + O$$

This reaction does not require three bodies to simultaneously collide; however, it is very sensitive to temperature, requiring high temperatures, and it is susceptible to reverse reaction:

$$SO_3 + O \rightarrow SO_2 + O_2$$

None of the above three reactions occur in any significant quantity in a reducing environment due to the lack of O and $O_2$ species. In a reducing environment, the direct conversion of $SO_3$ to $SO_2$ takes place through the following general "reducing" reaction:

$$SO_3 + R \rightarrow SO_2 + RO$$

Where R is any reducing radical species. The primary radical in fossil fuel combustion is the H radical.

$$SO_3 + H \rightarrow SO_2 + OH$$

Many radicals and molecules can be functional in a reducing environment; e.g., H, OH, C, CO, CH, $CH_2$, $C_2H$, $CH_3$, $C_nH_m$, N, $NH_i$, and many others.

The above $SO_3$ reducing reactions are very fast when there are significant concentrations of the reducing radicals ("R"). Sufficient concentrations exist primarily in reducing environments within the first (fuel-rich) stage of the furnace.

In a fuel-rich staged, reducing environment, oxidative chemistry terminates due to greatly decreased (extinguished) concentrations of oxidative combustion species; e.g., OH, O, $O_2$, $HO_2$, $H_2O_2$, and many others. In this environment, species are very competitive for any available oxygen species. Molecules with oxygen atoms that exist in relatively small concentrations are consumed by oxygen-wanting species that exist in high concentration; e.g., the oxygen in NO is consumed by other species like C, CO, H, and CH. Molecules that have multiple oxygen atoms are particularly at risk; i.e., $SO_3$ will quickly revert to $SO_2$ through oxygen abstraction by just about anything around, most notably H atoms.

Thus, in a reducing environment, the $SO_3$ reduction reaction is very fast virtually irreversible while the reducing environment is maintained.

Surprisingly and importantly, with the present invention methods and systems, the net effect is that any $SO_3$ that is formed during combustion is quickly reduced to $SO_2$ in the first stage and $SO_3$ is not reformed by oxidation to $SO_2$ because there is not enough residence time at sufficiently high temperature in the furnace in the latter, fuel-lean stages. Thus, the present invention advantageously uses the differences in reaction rates to reduce and maintain the $SO_3$ levels in the flue gas.

Increased staging increases the residence time in a reducing atmosphere, or increases the reducing potential of the atmosphere, to decrease $SO_3$ concentration and thereby lower the dewpoint temperature. Therefore, to increase the reduction of $SO_3$, the residence time can be increased or the reducing potential in the flue gases can be increased.

To increase residence time, several methods are available.
1) The distance between stages can be lengthened
2) The mixing can be increased for macro-staging applications
3) The mixing can be decreased for micro-staging applications
4) The mass flow between stages can be reduced (deeper staging)
5) The volumetric utilization between stages can be increased (e.g., swirl)
6) The pressure can be increased
7) The density can be increased To increase the reducing potential in the flue gases, several methods are available.
1) The temperature can be increased
2) The stoichiometric ratio (i.e., the air-to-fuel ratio) can be decreased.
3) The local fuel flow can be increased (for fixed air flow)
4) The local air flow can be decreased (for fixed fuel flow)

Mixing within a stage also influences the reduction process. A perfectly mixed stage with a stoichiometric mixture is the best, since these reaction conditions will give the highest temperature, while still maintaining the reducing environment; i.e., minimizing oxidation radicals like O radicals. But, since perfect mixing is impractical, in practice a stoichiometric ratio less than one is used, which minimizes the occurrence of localities with a stoichiometric ratio greater than one. However, as mixing is reduced, a longer residence time and/or higher temperature is needed to achieve a similar reduction of the total acidity, acid dewpoint temperature, and/or $SO_3$ concentration. However, the temperature of the combustion gases is dependent to a certain extent on the level of mixing, going down if mixing is decreased. Therefore, if an increased temperature is desired for a given degree of mixing, temperature must be increased by other means, such as preheating air, changing heat transfer characteristics of furnace, and the like. Alternatively or additionally, the residence time in the reducing environment can be increased by delaying lean stage air introduction, such as OFA injection.

Note that $SO_3$ is formed by the oxidation of $SO_2$ in a catalyst because a catalyst enables the oxidation of $SO_2$ though the following reaction:

$$SO_2 + \tfrac{1}{2} O_2 \rightarrow SO_3$$

Production of $SO_3$ in a catalyst is independent of the $SO_3$ concentration in the gas, since the catalyzed reaction is only dependent on the $SO_2$ and $O_2$ concentration. Therefore, any $SO_3$ that is reduced by the present invention independently reduces the exit $SO_3$ and is not affected by and does not affect $SO_3$ production in a catalyst.

The present invention thus provides a method for controlling and reducing flue gas acidity, specifically the flue gas concentrations of $SO_3$, in order to beneficially (1) affect the efficiency of an electrostatic precipitator, and more particularly, (2) to reduce the concentration of $SO_3$ and other reducible acids in the flue gas in order to reduce the flue gas acidity and acid dewpoint, thereby reducing air heater pluggage, duct corrosion, and $SO_3$ emissions to the environment, which can be a source of visible plumes and localized acid rain.

In a preferred embodiment of the present invention, macro-staging to regulate furnace acidity and $SO_3$ levels is achieved through the use of OFA. In another preferred embodiment, micro-staging to regulate furnace acidity and $SO_3$ levels is achieved through the use of low-NOx burners. In yet another preferred embodiment, macro-staging and micro-staging through the use of OFA and low-NOx burners in combination are used to regulate furnace acidity and $SO_3$ levels. For furnaces with SCRs in operation, the acidity is preferably regulated to reduce total flue gas acidity. For furnaces without SCRs or with by-passed SCRs, the $SO_3$ is preferably regulated such that the $SO_3$ levels going to the ESP enhance or favor precipitation. For current ESPs, $SO_3$ levels between about 10 to about 15 ppm (by volume) in the exhaust is desirable for best ESP efficiency.

The dewpoint temperature is a convenient parameter for estimating and/or adjusting the reducing environment variables in order to achieve adequate reduction of acidity and/or desired $SO_3$ levels. For a desired level of $SO_3$ and operating relative humidity, the dewpoint can be determined and the reducing environment variable adjusted accordingly to achieve the desired dewpoint. Other methods of determining acidity and/or $SO_3$ level can be used for the same purpose without departing from the scope of the invention.

In a preferred embodiment of the present invention, a power plant is operated to provide a deeply-staged, micro-stage or macro-stage reducing environment in the lower furnace. The OFA in the upper furnace provides the necessary oxygen to ensure an acceptable level of burnout of the remaining unburned fuel, combustion intermediates, and CO. Additionally, an SCR can be used to reduce NOx. Thus, an embodiment of the present invention includes a combustion furnace with OFA and low NOx burners for use with sulfur containing fuels to lower the dewpoint temperature and to reduce the $SO_3$ concentration. Additionally, an SCR can be provided to reduce NOx. The low NOx burners are preferably of a grade that provides adequate mixing in the primary stage to provide adequate acid dewpoint temperature reducing and $SO_3$ concentration reduction, thus permitting the use of an SCR, if necessary. Thus, an embodiment of the present invention includes a combustion furnace with high-grade low NOx burners for the purpose of reducing the flue gas acidity, lowering the acid dewpoint temperature and reducing the flue gas $SO_3$ concentration. This embodiment can further include an SCR.

An adequate reducing environment according to the present invention is one that will reduce SO3 to SO2 in less than about 2 seconds, more preferably, in less than about 0.5 seconds. In the present invention, such a reducing environment can be achieved when the first stage flue gas temperature is greater than or equal to 900 Kelvin (1160 degrees F.), more preferably greater than about 1255 K (1800 degrees F.), even more preferably greater than about 1650 K (2500 degrees F.). A reducing environment is one where the ratio of the concentrations of reducing radicals to oxidizing radicals is greater than about 1; more specifically, the ratio of the concentrations of H radicals to O radicals is greater than about 1. A better reducing environment is one where the ratio of the concentrations of reducing radicals to oxidizing radicals is greater than about 10; more specifically, the ratio of the concentrations of H radicals to O radicals is greater than about 10.

Thus, a method of controlling $SO_3$ flue gas concentration in a combustion process utilizing a SCR using a sulfurous fuel, includes the steps of:
a) providing a combustion system with low NOx burners and SCR
b) partially combusting the fuel in a first stage to create a reducing environment;
c) maintaining the reducing environment for a sufficient time period such that $SO_3$ is reduced to $SO_2$ to achieve a desirable level of $SO_3$;
d) combusting the remainder of the fuel and combustion intermediates in a second stage with oxidizing environment;
e) reducing the remaining NOx with the SCR;

thereby reducing emissions NOx.

An alternative method according to the present invention of controlling $SO_3$ flue gas concentration in a combustion process utilizing a SCR using a sulfurous fuel, includes the steps of:
a) providing a combustion furnace with low NOx burners and SCR
a) partially combusting the fuel in a first stage to create a reducing environment;
b) combusting the remainder of the fuel and combustion intermediates in a second stage with oxidizing environment;
c) measuring the acid dewpoint of the flue gas;
d) adjusting the reducing environment in the first stage such that the flue gas acid dewpoint is lowered to a desirable level;

thereby controlling the $SO_3$ concentration of the flue gas.

In another embodiment according to the present invention, a combustion furnace is operated with a method of controlling $SO_3$ flue gas concentration in a combustion process utilizing a SCR using a sulfurous fuel, comprising the steps of:
a) providing a combustion furnace with low NOx burners and SCR
b) partially combusting the fuel in a first stage to create a reducing environment;
c) maintaining the reducing environment for a sufficient time period such that reducible acids are reduced to achieve a desirable acidity concentration in the flue gas;
d) combusting the remainder of the fuel and combustion intermediates in a second stage with oxidizing environment;
e) reducing the remaining NOx with the SCR;

thereby controlling the flue gas $SO_3$ levels going to the SCR.

These methods can include the step of micro-staging and/or macro-staging the first stage fuel combustion and or macro. The micro-staging can be provided through the use of low-NOx burners and the macro-staging through the use of over-fired air. The fuel can be any fuel, especially carbonaceous fuels such as coal. The reducing environment can be adjusted by any of the means herein described, including adjusting the first stage residence time.

EXAMPLES

The following examples illustrate the results that can be achieved using methods according to the present invention. Methods according to the present invention were used to control $SO_3$ levels at 3 different power plants. The experimental data shown in Tables 1 and 2 were achieved through the use of high-velocity over-fired air and were measured by third-party companies.

TABLE 1

Effects of Staging Depth on SO3 levels at 2 different plants.

| Parameters | Plant 1 | | Plant 2 | |
| --- | --- | --- | --- | --- |
| | Staging Depth | | | |
| | Shallow | Deep | Shallow | Deep |
| Load (MW$_{net}$) | 182 | 179 | 154 | 154 |
| NOx (lb/MMBtu) | 0.64 | 0.36 | 0.63 | 0.28 |
| Coal % S (%) | 1.22 | 1.22 | 0.87 | 0.87 |
| Outlets SO$_2$ (ppm) | 1100 | 1100 | 720 | 720 |

TABLE 1-continued

Effects of Staging Depth on SO3 levels at 2 different plants.

| | Plant 1 | | Plant 2 | |
|---|---|---|---|---|
| | Staging Depth | | | |
| Parameters | Shallow | Deep | Shallow | Deep |
| Load ($MW_{net}$) | 182 | 179 | 154 | 154 |
| Outlet $SO_3$ (ppm) | 19 | 5.7 | 11* | 0.5 |
| $SO_3/SO_2$ (%) | 1.7 | 0.52 | 1.5* | 0.07 |
| $SO_3$ Reduction | | 70% | | 95% |

N/A - Data Not Available;
*Estimated based on assumption that 98.5% of the sulfur in coal goes to SO2 and 1.5% of the sulfur in coal goes to SO3.

For the "shallow" staging cases, the over-fired air ports were nearly closed, but still contained cooling flow (around 10% of the total air). For the "mid" staging case, the over-fired air ports made up nearly 20% of the total air flow. For the "deep" staging cases, the over-fired air ports made up nearly 30% of the total air flow. All three units were corner-fired units and the OFA system was located well above the burner zone.

TABLE 2

Effect of three levels of staging at a single plant (Plant 3, different from Table 1).

| | Staging depth | | |
|---|---|---|---|
| Parameters | Shallow | Mid | Deep |
| Load ($MW_{net}$) | 72 | 72 | 72 |
| NOx (lb/MMBtu) | 0.56 | 0.48 | 0.34 |
| Coal % S (%) | 2.85 | 2.85 | 2.85 |
| Outlets $SO_2$ (ppm) | 1856 | 1855 | 1856 |
| Outlet $SO_3$ (ppm) | 5.9 | 1.9 | 1.1 |
| $SO_3/SO_2$ (%) | 0.32 | 0.1 | 0.06 |
| $SO_3$ Reduction (vs Shallow) | | 68% | 81% |

Thus, the experimental data demonstrate the ability to regulate the $SO_3$ level using methods according to the present invention.

Certain modifications and improvements will occur to those skilled in the art upon a reading of the foregoing description. All modifications and improvements have been deleted herein for the sake of conciseness and readability but are properly within the scope of the following claims.

What is claimed is:

1. A method of controlling $SO_3$ flue gas concentration in a combustion process utilizing a SCR using a sulfurous fuel, comprising the steps of:
    a) providing a combustion system with low NOx burners and SCR
    b) partially combusting the fuel in a first stage to create a reducing environment;
    c) maintaining the reducing environment for a sufficient time period such that $SO_3$ is reduced to $SO_2$ to achieve a desirable level of $SO_3$;
    d) combusting the remainder of the fuel and combustion intermediates in a second stage with oxidizing environment;
    e) reducing the remaining NOx with the SCR;
thereby reducing emissions NOx.

2. The method of claim 1, further including the step of micro-staging the first stage fuel combustion.

3. The method of claim 2, wherein the micro-staging includes the use of low-NOx burners.

4. The method of claim 1, further including the step of macro-staging the first stage of fuel combustion.

5. The method of claim 4, wherein the macro-staging is provided through the use of over-fired air.

6. The method of claim 1, further including a combination of micro-staging and macro-staging.

7. The method of claim 6, wherein the micro-staging includes the use of low-NOx burners and the macro-staging is provided by over-fired air.

8. The method of claim 1, wherein the fuel is coal.

9. A method of controlling $SO_3$ flue gas concentration in a combustion process utilizing a SCR using a sulfurous fuel, comprising the steps of:
    a) providing a combustion furnace with low NOx burners and SCR
    b) partially combusting the fuel in a first stage to create a reducing environment;
    c) combusting the remainder of the fuel and combustion intermediates in a second stage with oxidizing environment;
    d) measuring the acid dewpoint of the flue gas;
    e) adjusting the reducing environment in the first stage such that the flue gas acid dewpoint is lowered to a desirable level;
thereby controlling the $SO_3$ concentration of the flue gas.

10. The method of claim 9, wherein the step of adjusting the reducing environment includes adjusting the first stage residence time.

11. The method of claim 9, further including the step of micro-staging the first stage fuel combustion.

12. The method of claim 11, wherein the micro-staging is provided through the use of low-NOx burners.

13. The method of claim 9, further including the step of macro-staging the first stage of fuel combustion.

14. The method of claim 13, wherein the macro-staging is provided through the use of over-fired air.

15. The method of claim 9, further including a combination of micro-staging and macro-staging.

16. The method of claim 15, wherein the micro-staging is provided by low-NOx burners and the macro-staging is provided by over-fired air.

17. The method of claim 9, wherein the fuel is coal.

* * * * *